United States Patent
Hymer (12)

(10) Patent No.: US 6,453,568 B1
(45) Date of Patent: Sep. 24, 2002

(54) LASER PROTRACTOR

(76) Inventor: Jeff Hymer, 2201 Fairway Dr., Jupiter, FL (US) 33477

(*) Notice: Subject to any disclaimer, the term of this patent is extended or adjusted under 35 U.S.C. 154(b) by 0 days.

(21) Appl. No.: 09/443,794

(22) Filed: Nov. 19, 1999

Related U.S. Application Data

(60) Provisional application No. 60/109,367, filed on Nov. 21, 1998.

(51) Int. Cl.[7] .................................................. G01C 3/00
(52) U.S. Cl. ............................ 33/276; 33/278; 33/415; 33/418; 33/452; 33/471; 33/DIG. 21
(58) Field of Search .......................... 33/276, 277, 278, 33/281, 283, 285, 286, 404, 451, 415, 416, 417, 418, 423, 452, 465, 471, DIG. 21

(56) References Cited

U.S. PATENT DOCUMENTS

| | | | | |
|---|---|---|---|---|
| 576,900 A | * | 2/1897 | Scott ............................ | 33/277 |
| 2,249,728 A | * | 7/1941 | Cross ........................... | 33/276 |
| 2,679,105 A | * | 5/1954 | Herrick ........................ | 33/280 |
| 2,697,234 A | * | 12/1954 | Sturdevant ................... | 33/276 |
| 4,383,372 A | * | 5/1983 | Zane et al. ................... | 33/276 |
| 4,407,012 A | * | 9/1983 | Desmaret ..................... | 33/281 |
| 5,394,616 A | * | 3/1995 | Claxton ........................ | 33/277 |
| 5,713,135 A | * | 2/1998 | Acopulos ..................... | 33/451 |
| 5,842,282 A | * | 12/1998 | Ting ............................. | 33/281 |
| 5,894,675 A | * | 4/1999 | Cericola ....................... | 33/286 |

FOREIGN PATENT DOCUMENTS

| DK | | 3802461 A1 | * 8/1989 | .................. 33/280 |
|---|---|---|---|---|

* cited by examiner

Primary Examiner—Randy W. Gibson
(74) Attorney, Agent, or Firm—James M. Deimen

(57) ABSTRACT

A laser protractor comprising two laser pointers fixed in a body to point exactly 90° apart in the same plane and a third laser pointer mounted on a movable arm rotatable about an axis perpendicular to the intersection of the first two laser pointers (as extended). The laser protractor includes leveling bubbles and degree scales on the body permitting the protractor to be accurately positioned with both fixed lasers in a horizontal plane, in a vertical plane or in any other plane as required. The laser protractor, because of its simple rugged construction, can be made inexpensively with simple off-the-shelf pointers, each battery powered with inexpensive batteries.

6 Claims, 2 Drawing Sheets

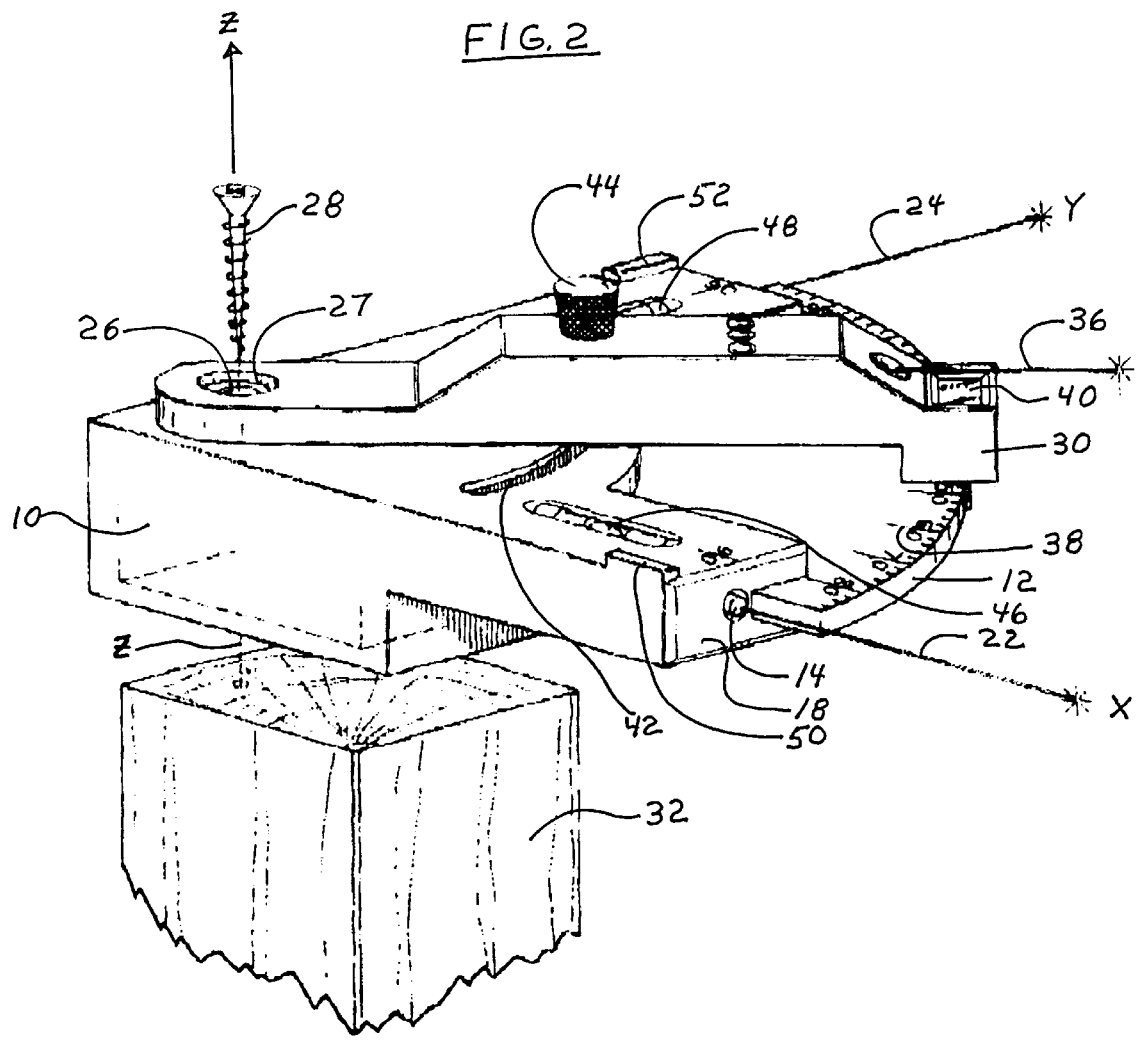

LASER PROTRACTOR

This application is a complete application based on provisional patent application No. 60/109,367, filed Nov. 21, 1998.

BACKGROUND OF THE INVENTION

The field of the invention pertains to measuring devices, in particular to protractors for measuring angles. Such protractors are used for measuring angles over small distances on drawing boards and sketches or plans, however, when angles need to be measured over long distances a simple hand held plastic device is not adequate.

Typically, measurement of angles over long distances has required the use of a surveyor's transit, however, a surveyor's transit is a bulky device mounted on a tripod and designed for use over relatively great distances such as for the measurement of land parcels. In recent years, laser sending and receiving devices in combination with dedicated computing electronics and global positioning systems (GPS) have been added to transits to provide significantly more accurate results. These improvements to transits, while very useful, have added considerable cost to the transits because the improvements must be protected against the hazards of outdoor use in inclement weather.

Intermediate distances are encountered in building construction. The distances are too great for small protractors but do not require the accuracy of laser transits. Ordinary transits continue to be used in building construction. More recently construction levels have been fitted with laser pointers to extend their "reach" both vertically and horizontally. Other devices have been developed to align holes vertically for plumbing installation. However, there remains a need for a more universally useful device to measure angles at intermediate distances such as for short sewer lines, roof pitches, drain fields, drainage ditches, foundation footings and landscaping.

SUMMARY OF THE INVENTION

As a result of the development of relatively inexpensive laser pointers, a truly useful laser protractor is a realistic goal. Disclosed below is a laser protractor comprising two laser pointers fixed in a body to point at exactly 90° apart in a plane formed by the laser pointers. A third laser pointer is mounted on a movable arm rotatable about an axis perpendicular to the intersection of the first two laser pointers (as extended). With suitable leveling bubbles and degree scales on the body an intermediate distance laser protractor is created by the combination. The laser protractor, because of its simple rugged construction can be made inexpensively with simple off the shelf laser pointers, each battery powered with inexpensive batteries.

BRIEF DESCRIPTION OF THE DRAWINGS

FIG. 2 is a perspective view of the laser protractor mounted on a post.

DESCRIPTION OF THE PREFERRED EMBODIMENT

Figure 1:
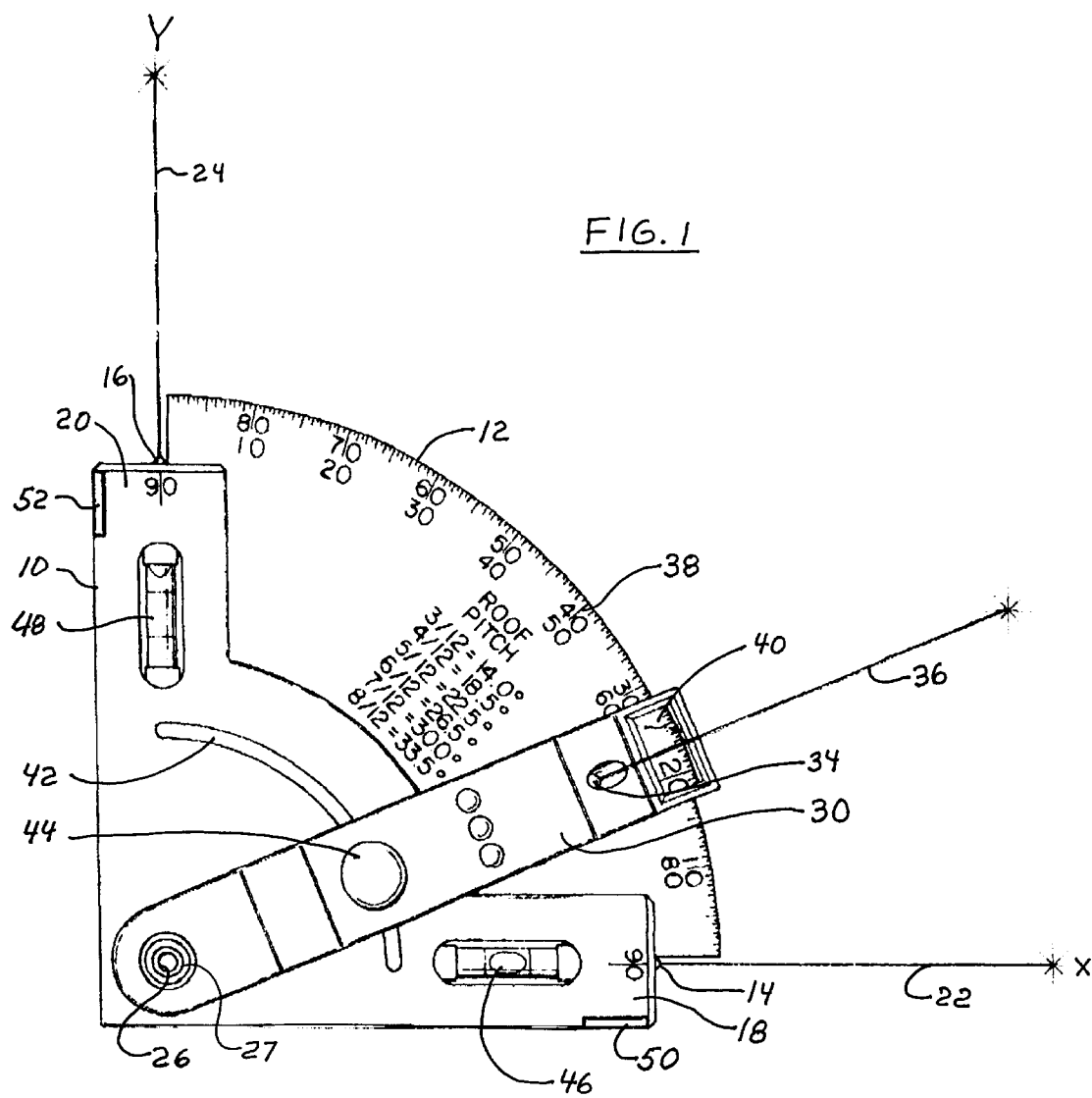
FIG. 1 is a plan view of the new laser protractor.

The new laser protractor illustrated in FIGS. 1 and 2 comprises an L-shaped body 10 having a quarter sector scale portion 12 extending therefrom. A pair of small laser pointers 14 and 16 are mounted in each arm 18 and 20 of the body 10. The laser pointers 14 and 16 produce coherent light beams 22 and 24 along X and Y axes respectively, these axes being angularly exactly 90° apart. The X and Y axes intersect behind the laser pointers 14 and 16 at a third Z axis perpendicular to both. The Z axis also forms the center of a hole 26 for a fastener such as the screw 28 shown.

The hole 26 extends through both the body 10 and a movable arm 30 whereby the arm pivots about the screw 28. As shown in FIG. 2 the screw 28 retains the laser protractor to a wooden post 32 with the protractor in a horizontal orientation. While the screw 28 may be used to retain the arm 30 to the body 10 without other fastening means, preferably a sleeve 27 flared at each end may be used to permanently fasten the arm to the body.

The moveable arm 30 has mounted therein a third laser pointer 34 with a coherent light beam 36 coincident with a line intersecting and perpendicular to the Z axis. The quarter sector scale portion 12 includes a degree scale 38 and the moveable arm 30 includes a magnifying lens 40 over the degree scale. Thus, the angle of the coherent light beam 36 can easily be read from the scale.

The body 10 is formed with a curved undercut slot 42 and the moveable arm 30 includes a knurled nut 44 that engages a headed screw (not shown), the head of which, in turn, engages the slot 42 in a commonly known manner. Thus the moveable arm 30 may be temporarily fixed in an angular position by tightening the knurled nut 44.

Mounted in the body 10 are a pair of bubble levels 46 and 48. Bubble levels 46 and 48 are mounted just above and parallel to the X-axis and Y-axis respectively. When the laser protractor is used in the horizontal position as shown in FIG. 2, a level protractor can be assured by a level reading on both bubble levels 46 and 48. If the laser protractor is used vertically, then only the bubble level 46 or 48 corresponding to the X or Y axis that remains horizontal is considered. Only the horizontal bubble level 46 or 48 is considered where the other bubble level and axis is between the horizontal and the vertical. A pair of vertically extending stops 50 and 52 prevent the movable arm 30 from going off scale. Or, in the alternative, the ends of the curved undercut slot 42 may form the stops for the movable arm 30.

The new laser protractor is particularly advantageous for interior building usage and building construction where the screw 28 can be fastened to a post or other building part exactly at the appropriate origin for the angle to be measured or marked at a remote location. Where a screw 28 is not suitable, any other fastener may be used to mount the laser protractor for accurate measurement.

What is claimed is:

1. A protractor comprising a body and an arm rotatably affixed to the body, a first laser affixed to the body and capable of producing a coherent light beam in a specified direction forming a first axis relative to the body, a second laser affixed to the body and capable of producing a coherent light beam in a specified direction forming a second axis relative to the body, wherein the specified direction of the first laser and the specified direction of the second laser, each extended behind the first laser and the second laser, respectively, intersect perpendicularly, and said arm rotatable about a third axis, said third axis passing through the perpendicular intersect and perpendicular to both the specified direction of the first laser and the specified direction of the second laser, a third laser affixed to the arm and capable of producing a coherent light beam in a specified direction relative to the arm, said specified direction of the third laser as extended behind the third laser perpendicularly intersecting the third axis, and means to indicate the angular relationship of the light beam of the third laser relative to at least one of the light beams of the first and second lasers.

2. The protractor of claim 1 wherein the means to indicate the angular relationship comprise a scale on the body in a plane perpendicular to the third axis.

3. The protractor of claim 2 including a first level on the body to indicate levelness of the light beam of the first laser and a second level on the body to indicate levelness of the light beam of the second laser.

4. The protractor of claim 1 including a first level on the body to indicate levelness of the light beam of the first laser and a second level on the body to indicate levelness of the light beam of the second laser.

5. The protractor of claim 1 including means to temporarily retain the protractor to a support.

6. A protractor comprising a body and an arm rotatably affixed to the body, a first direction fixed relative to the body and defined by a first coherent light beam, a second direction fixed relative to the body and defined by a second coherent light beam, said first and second fixed directions forming first and second axes, respectively, said first and second axes positioned relative to the body to perpendicularly intersect, a third direction specified relative to the arm and defined by a third coherent light beam and a third axis passing through the intersect of the first and second axes, said third axis forming the axis of rotation of the arm relative to the body, and at least one laser on said protractor capable of producing said coherent light beams.

* * * * *